June 23, 1959  T. K. CRAMER ET AL  2,891,283
APPARATUS FOR MOLDING PARTS HAVING IRREGULAR OUTER SURFACES
Filed May 29, 1956  2 Sheets-Sheet 1

INVENTORS
TREVOR K. CRAMER
ALFRED M. CHABOTTE
BY
Pennie, Edmonds, Morton, Barrows & Taylor
ATTORNEYS

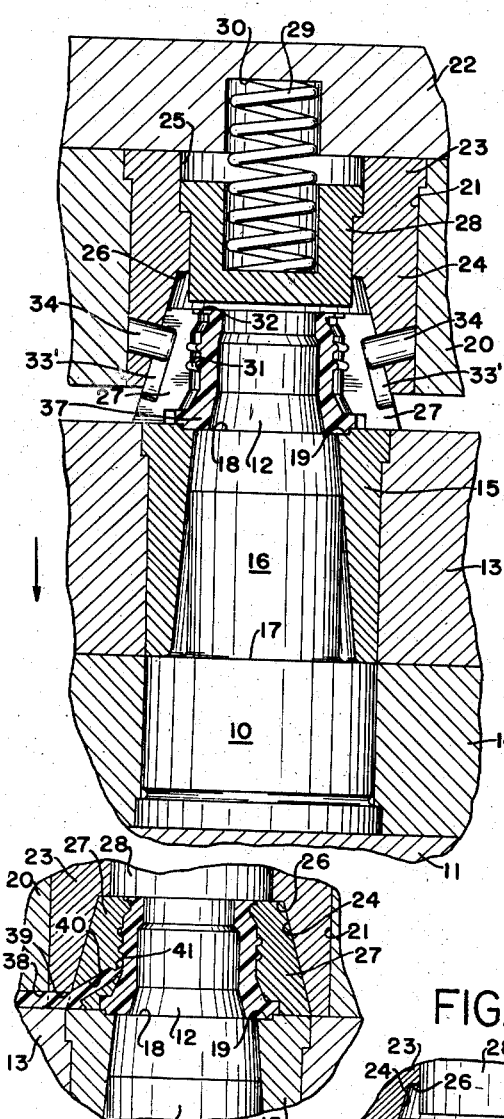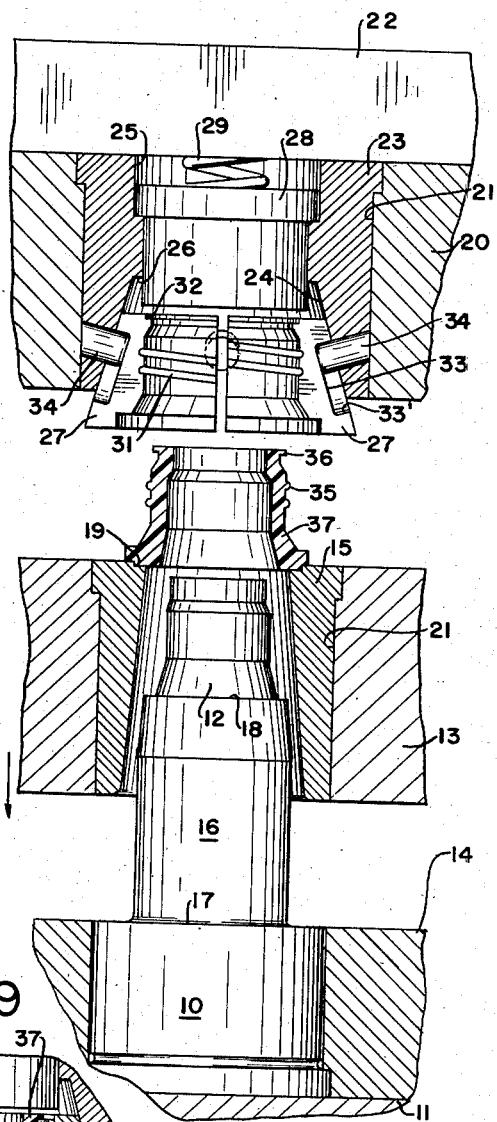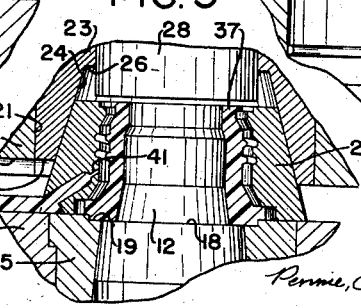

United States Patent Office 2,891,283
Patented June 23, 1959

2,891,283

APPARATUS FOR MOLDING PARTS HAVING IRREGULAR OUTER SURFACES

Trevor K. Cramer, Norwichtown, and Alfred M. Chabotte, Norwich, Conn., assignors to Plastene Corporation, Crawfordsville, Ind., a corporation of Indiana Application May 29, 1956, Serial No. 588,091

13 Claims. (Cl. 18—42)

The present invention relates to apparatus for molding parts of plastic or similar materials, and more particularly to an improved mold apparatus having novel and improved features especially adapting the apparatus for the molding of parts having threads or other irregularities on their outer surfaces.

In the molding of plastic parts having threads or undercuts, for example, on their outer surfaces, certain problems arise in connection with the removal of the molded part upon completion of the molding operation. Thus, it is first necessary to separate the parts of the female half of the mold from the molded product in order to clear the threaded or undercut portions and enable the part to be withdrawn axially from the mold. While various arrangements have been suggested for effecting separation of the female mold parts prior to withdrawal of the molded piece, such prior arrangements are relatively complicated, and result in considerable expense in the manufacture of the molding apparatus.

Accordingly, the present invention provides an improved and substantially simplified mold assembly which is effective in an improved manner to separate the parts of the female mold and permit the ready withdrawal of the molded piece upon completion of a molding operation. The new apparatus involves a minimum of parts, is simple to manufacture, assemble, and maintain, and is particularly adapted for incorporation in molding machines adapted to mold a plurality of parts at one time. It also requires a minimum of lateral area for what may be termed a multi-cavity unit, involving the use of no gears, racks, etc., for separation of the parts of the female mold.

In the new apparatus, the female part of the mold comprises a plurality of separate segments which together form a complete mold cavity. During a molding operation, the segments are received in a retainer member which holds the several segments tightly together to form the desired mold cavity. Each of the segments is provided at its edges with recesses, arranged so that when the segments are assembled together adjacent pairs of the recesses form tapered slots. When the mold segments are fully received in the retainer therefor, pins project into the wide portions of the slots. Separation of the mold segments at the end of a molding operation is then effected by urging the mold segments axially out of the retainer, so that the pins are forced into the narrow portion of the tapered slots. The several segments are thereby spread apart a sufficient distance to free the threads or undercut portions of the molded piece, and the piece may then be readily withdrawn from the mold cavity.

The new apparatus also incorporates novel features facilitating the separation of the molded part from the runner of plastic material remaining in the sprue, through which the material is injected ito the mold cavity. To this end, one of the segments has a necked-down sprue, opening into the mold cavity. The runner, which is attached to the part after it has set, is of small cross-section adjacent the part and may be readily broken away.

Accordingly, as the cavity segments are separated from the molded piece at the end of a molding operation the necked-down runner is automatically broken free of the part.

For a better understanding of the invention, reference should be made to the following detailed description and accompaying drawings, in which:

Fig. 6 is a fragmentary longitudinal cross-sectional view similar to Fig. 1, showing the segments of the female mold in separated positions prior to withdrawal of a molded piece;

Fig. 7 is a fragmentary longitudinal cross-section of the apparatus of Fig. 1, showing the positions of the parts of the apparatus after freeing of the molded piece from the mold; and Figs. 8 and 9 are fragmentary cross-sectional views of the new mold structure, illustrating the improved arrangements for breaking away the runner from a finished part at the end of a molding operation.

Figure 1:
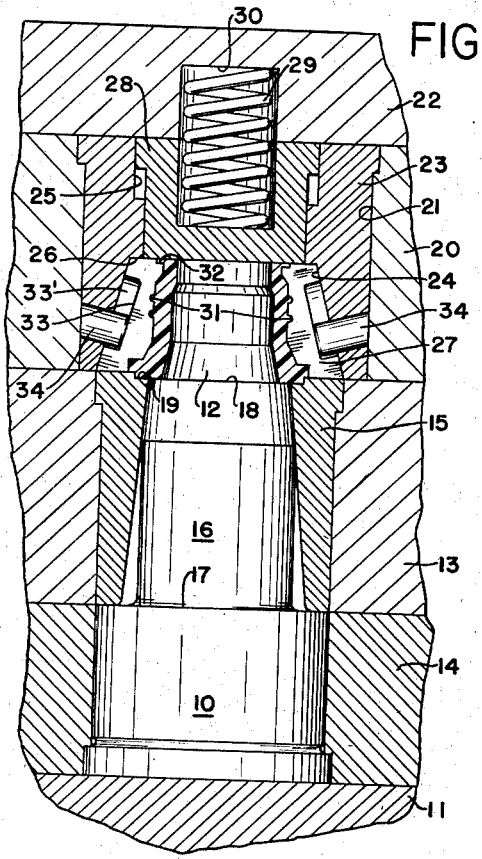
Fig. 1 is a fragmentary longitudinal cross-sectional view of an injection molding apparatus incorporating the features of the invention.

Referring initially to Fig. 1, the injection molding apparatus therein shown comprises a core 10 mounted at one end on a movable support 11 and having a contoured portion 12 at its free end defining the inner wall of a mold cavity. Surrounding the lower portion of the core 10 is a core plate 14. Above core plate 14 is a stripper or ejector plate or support 13 which receives and supports an annular ejector sleeve or stripper 15 in its upper portion. The ejector sleeve 15 fits closely about the intermediate portion 16 of the core 10, and has walls extending downwardly and adapted to have abutting engagement with a shoulder 17 at the base of the intermediate core portion 16.

A shoulder 18, formed at the upper end of the intermediate core portion 16, defines in part the lower end of the mold cavity, and in the illustrated form of the invention an upper end surface portion 19 of the ejector sleeve 15 lies in the plane of the shoulder 18 and forms therewith the end of the mold cavity.

The upper portion of the mold apparatus, sometimes referred to as the injection half of the mold, comprises a support 20 having a shouldered opening 21 therein covered by a top plate 22. The shouldered opening 21 receives a flanged cavity retainer 23, which is generally cylindrical in form and has a tapered recess 24 therein opening at the bottom. The recess 24 is of truncated conical form, having walls which diverge toward the lower end of the retainer. The upper portion of the retainer 23 has a shouldered recess 25 therein, the lower end of which opens into the upper end of the main recess 24. As will be observed, the lower end of the shouldered upper recess 25 is of smaller diameter than the upper end of the main recess 24, so that a small shoulder 26 is formed at the upper end of the latter.

In accordance with the invention, the main recess 24 is adapted to receive a plurality of mold cavity segments 27, four such segments being employed in the illustrated apparatus. The segments are separable, but are adapted, when assembled together, to form a continuous inner surface defining the outer walls of the mold cavity. The cavity segments 27 are in the form of segments of a truncated cone, and when the segments are assembled together the outer shape and dimensions of the assembly are the same as those of the main recess 24 in the cavity retainer 23. Thus, when the plurality of segments 27 are fully received within the recess 24 the separable segments are confined and held together by the walls of the recess so that the inner walls of the segments define the desired mold cavity.

As shown in Fig. 1, the lower edges of the cavity segments 27 are flush with the lower end surface of the cavity retainer 23 when the segments 27 are fully received in the tapered recesss 24. Likewise, the upper end surface of the ejector sleeve 15 lies flush with the upper surface of the ejector support 13. Accordingly, when the ejector support 13 is brought together with the cavity support 20 the upper end of the ejector sleeve 15 will engage the lower ends of the several cavity segments 27, forcing the segments into the recess 24, and insuring the retention of the segments in their assembled form.

The cavity opening defined by the several segments 27 is somewhat larger than the free end portion 12 of the core 10, so that in the complete mold apparatus an annular space is defined between the core portion 12 and the assembled cavity segments 27. The lower end of the annular space is closed off by shoulder portions 18, 19 of the core and ejector sleeve, respectively. The upper end of the annular cavity space is closed by the lower end of a flanged cup member 28 which is slidably received in the shouldered recess 25 in the cavity retainer. In the closed condition of the apparatus the cup-shaped plunger 28 is held tightly in engagement with the upper ends of the core portion 12 and cavity segments 27 by means of back-up plate 22, while in partially open condition of the apparatus a coil spring 29 received in the hollow portion of the cup 28 and in a recess 30 in the back-up plate 22 performs this function.

Figure 2:
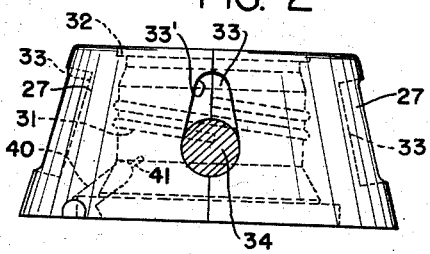
Fig. 2 is an enlarged elevational view showing the improved multi-part female mold constructed in accordance with the invention.
Figure 3:
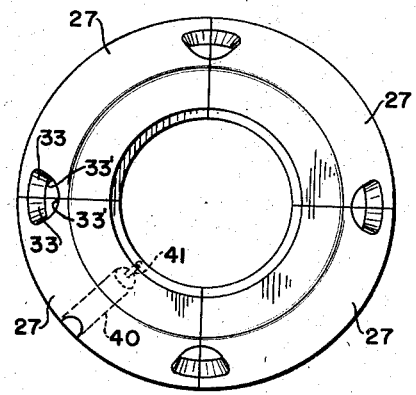
Fig. 3 is a top plan view of the female mold of Fig. 2.

In the completed and closed mold, the cavity defined by the plurality of segments 27 has threads 31 and one or more shoulders as indicated at 32. After molding of a part, it is necessary to separate the cavity segments 27 in a radial direction in order that the threads 31 and shoulder 32 will clear the molded part and permit axial withdrawal thereof. To this end, and in accordance with the teachings of the invention, each of the cavity segments 27 is provided along its vertical marginal edge portions with recesses 33 which may be of uniform depth, but which have side walls 33' (Fig. 4) disposed at an angle to the vertical. This arrangement is such that the side wall 33' of each recess is closer to the edge of the segment at the top of the recess than at the bottom. Thus, when the several cavity segments 27 are assembled together, the plurality of recesses 33 are arranged in adjacent pairs and define slots which taper inwardly from bottom to top, as clearly indicated in Fig. 2, for example. The recesses 33 are rounded at their upper and lower ends, so that the tapered slots defined by adjacent pairs of the recesses have semi-circular end portions.

Secured in the cavity retainer member 23, and projecting into the main recess 24 thereof, are a plurality of angularly spaced pins 34. The diameter of the pins 34 is substantially equal to the width of the lower ends of the tapered slots defined by the respective pairs of recesses 33. The arrangement is such that when the cavity segments 27 are fully received in the main recess 24 of the cavity retainer, the projecting portions of the pins 34 enter the lower ends of the tapered slots at the adjoining edges of the segments. In this position, the pins 34 do not interfere with the complete closing together of the several segments. When the segments 27 are moved downwardly in the retainer 23, however, the narrower upper portions of the slots move over the projecting portions of the pins 34. The upper portions of these slots are, in accordance with the invention, of lesser width than the diameter of the pins 34, so that the segments 27 are moved apart by the wedging action between the pins 34 and the inclined side walls 33' of the recesses 33. The inclination of the side walls 33' is advantageously so related to the inclination of the walls of the recess 24 that longitudinal movement of the segments 27 with respect to the pins 34 will effect radial movement of the segments 27 at the same rate at which the walls of the recess 24 diverge. In this manner, the segments 27 are at all times kept in contact with the walls of the recess 24.

Figure 4:
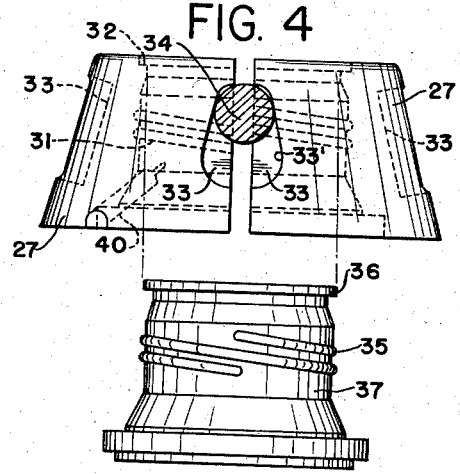
Fig. 4 is an enlarged elevational view of the female mold of Fig. 2, with the mold segments in a separated position, indicating the manner in which a molded part is removed therefrom.
Figure 5:
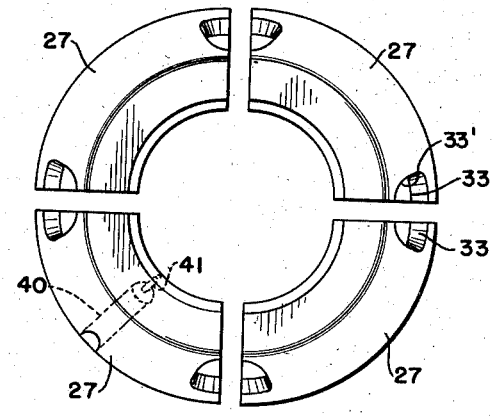
Fig. 5 is a top plan view of the female mold of Fig. 2, with the mold segments in separated positions.

In the enlarged view of Fig. 4, the several cavity segments 27 are shown in their separated positions, wherein the pins 34 lie in the upper portions of the tapered slots defined by respective pairs of the recesses 33. In this position, the segments 27 are sufficiently separated that the threads 35 and flange 36 of a molded part 37 clear any projections on the inner surfaces of the cavity segments, permitting the part 37 to be withdrawn axially from within the segments.

To carry out a molding operation with the new apparatus, the core support 11, ejector plate 13, core plate 14 and cavity support 20 are closed, as shown in Fig. 1. The cavity segments 27 are thus held tightly in place in the tapered recess 24, and the ends of the annular cavity defined between the segments 27 and the end portion 12 of the core are tightly closed. At this time, plastic material is injected into the mold cavity.

As shown in Fig. 8, the cavity support 20 and retainer 23 have recesses 38, 39 in their lower walls connecting with a passage 40 in one of the cavity segments 27. The passage 40 has a necked-down portion 41 leading into the mold cavity. Together, the recesses 38, 39 and passages 40, 41 form a sprue, through which plastic material may be injected, under pressure, into the mold cavity. The recesses 38, 39 are open at the bottom, but are adapted to be closed during a molding operation by the ejector part 13.

After the plastic material has hardened in the mold, the core support 11, ejector or stripper plate 13 and core plate 14 are separated, as a unit, from the cavity support 20 substantially as indicated in Fig. 6. The molded part 37 tends to adhere to the upper end 12 of the core, so that the piece 37 and the cavity segments 27 lockingly engaged therewith tend to separate from the cavity support 20 along with the core and ejector supports. The cavity segments thus tend to move axially out of the recess 24, and this axial movement is assisted by the spring 29, which applies pressure to the upper ends of the segments 27 through the slidable cup member 28.

As the segments 27 are forced downwardly, they are caused to separate radially, as heretofore explained. The initial radial separation of the segments 27 causes the runner of plastic material remaining in the necked-down passage 41 to be broken free of the part 37, as shown in Fig. 9. Further downward movement of the segments, under the force of the spring 29, moves the segments apart sufficiently that the threads and other projections of the molded piece are clear of any projecting portions of the segments 27. At this time, the pins 34 will engage the upper walls of the recesses 33 in the cavity segments and prevent further downward movement of the segments. The relationship of the cavity segments 27 and separating pins 34 at this point is clearly illustrated in Fig. 4.

In accordance with the invention, the length of the tapered slots defined by the recesses 33 is such that when the pins 34 engage the upper ends of the slots the several cavity segments 27 will be separated to such an extent that axial clearance is provided between the molded part 37 and the cavity segments 27. Accordingly, further separating movement of the unit (core support 11, core plate 14 and ejector plate 13) causes the molded part 37 to be completely withdrawn from the mold cavity, substantially in the manner indicated in Fig. 7. At this point, movement of the ejector support 13 is stopped, while movement of the core support 11 and core plate 14 is continued. The molded part 37 being supported by the ejector sleeve 15, remains stationary while the upper portion 12 of the core is forcibly withdrawn from within the molded part. The part 37 may now be readily removed from the molding apparatus.

When the segments 27 are moved outwardly of the tapered recess 24, the runner of plastic material engaged in the passage 40, 41 is carried downwardly out of the recesses 38, 39. This makes the runner readily accessible, enabling it to be easily removed before the next operation is begun.

The advantages of the invention should now be apparent. The new molding apparatus provides a simple and inexpensive, yet wholly practical, arrangement for the mass production molding of parts having outer surface irregularities, such as threads, undercuts, or the like. One of the important features of the new apparatus resides in the provision of a cavity retainer having a tapered recess therein, in which are received a plurality of separable cavity segments. The segments are provided with recesses along their side edge portions which, when the segments are assembled together, form tapered slots spanning the splits between the several segments. The cavity retainer also mounts pins having projecting portions received in the tapered slots and adapted upon outward movement of the segments in the cavity retainer to effect a radial separation of the segments.

Spring means are provided in the cavity retainer for urging the cavity segments outwardly of the retainer and into separated relation. When the mold is closed, an abutment member is brought into engagement with the exposed end edges of the segments, and the segments are forcibly pushed into the retainer against the action of the spring means. This causes the segments to tightly close together and define the desired mold cavity. The segments automatically separate when the mold is opened, so that the irregular molded part is readily released therefrom. When the mold is opened, the runner of plastic material is automatically severed from the molded part, so that the part emerges from the machine in a substantially finished condition.

The outstanding advantages of the new apparatus are its inherent simplicity, economy in manufacture, and ease of maintenance. Moreover, in the new apparatus, the structure of the individual molds may be highly compact, so that the apparatus is ideally suited for incorporation in modern mass-production molding equipment, having provisions for the simultaneous molding of a large number of like parts.

It should be understood, however, that the specific apparatus herein illustrated and described is intended to be representative only. Reference should therefore be made to the following appended claims in determining the full scope of the invention.

We claim:

1. In a molding apparatus for molding parts having irregular outer surfaces, the combination of a cavity support, said cavity support having means therein defining a tapered recess, a plurality of cavity segments receivable in said recess and having outer walls complementary to the walls of said recess, said cavity segments having complementary side edge portions adapted when said segments are assembled together and fully received in said recess to fit closely together whereby the inner surfaces of said segments define a continuous mold cavity, said cavity segments having recesses in their side edge portions, the recesses of adjacent segments forming complementary pairs and defining a plurality of tapered slots in the outer side wall of the cavity segment assembly, and separating means mounted by said cavity support and projecting into said tapered slots for effecting radial separation of said segments upon movement thereof outwardly of said tapered recess.

2. The apparatus of claim 1, including spring means acting on said segments and normally urging the same outwardly of said tapered recess.

3. The apparatus of claim 2, wherein said spring means includes a member engaging said cavity segments at one end and operative when said segments are fully received within said tapered recess to close one end of said cavity segment assembly.

4. The apparatus of claim 2, including means adapted to act on said segments in opposition to said spring means to urge said segments into said tapered recess.

5. The apparatus of claim 1, wherein said cavity segments are in the shape of segments of a truncated cone.

6. The apparatus of claim 1, wherein said separating means comprise a plurality of pins, each of said tapered slots having a large width substantially equal to the diameter of said pins and a small width substantially less than the diameter of said pins.

7. The apparatus of claim 1, including a core member movable with respect to said cavity support, abutment means movable with said core member for engaging said cavity segments and urging the same into said tapered recess, and means acting in opposition to said abutment means for urging said cavity segments outwardly of said tapered recess.

8. The apparatus of claim 1, wherein said tapered slots are closed at their narrow ends to provide surfaces engageable by said separating means after a predetermined outward movement of said segments to prevent further outward movement of said segments.

9. The apparatus of claim 1, wherein one of said cavity segments has a necked-down passage therein leading into said mold cavity, and forming a passage for admitting a liquid material into said mold cavity, said necked-down passage being adapted to confine the runner of material after a molding operation and to sever said runner from the molded part upon radial separation of said cavity segments.

10. The apparatus of claim 9, characterized by said cavity support having a recess therein communicating with said necked-down passage and having an open side exposed at the surface of said support in which said tapered recess is formed, and including means to close said open side when said cavity segments are fully received in said tapered recess, said means to close being adapted to expose said open side when said cavity segments are moved outwardly of said tapered recess.

11. In a molding apparatus for molding parts having irregular outer surfaces, the combination of a cavity support, said cavity support having means therein defining a tapered recess, the walls of said tapered recess converging inwardly of said support, a plurality of cavity segments receivable in said recess and having outer walls complementary to the walls of said recess, said cavity segments having complementary side edge portions adapted when said segments are assembled together and fully received in said recess to fit closely together whereby the inner surfaces of said segments define a continuous mold cavity, said cavity segments having recesses in their side edge portions, the recesses of adjacent segments forming complementary pairs and defining a plurality of slots in the outer side wall of the cavity segment assembly, said slots having side walls converging in the direction of convergence of said tapered recess, a plurality of pins mounted on said cavity support and having portions projecting into said tapered recess, said projecting portions being receivable in said tapered slots, said pins being of greater width than the converging ends of said slots whereby upon movement of said segments outwardly of said tapered recess said pins engage the side walls of said slots to effect the radial separation of said segments.

12. The apparatus of claim 11, wherein said cavity segments have the shape of segments of a truncated cone, and said pins have their axes lying in planes defined by the side edges of said segments.

13. The apparatus of claim 11, wherein the taper of said slots is so related to the taper of said tapered recess that during movement of said segments outwardly of said tapered recess said segments are separated radially at a rate substantially equal to the rate of increase in the diameter of said tapered recess.

References Cited in the file of this patent

UNITED STATES PATENTS

| | | |
|---|---|---|
| 895,650 | Loomis | Aug. 11, 1908 |
| 1,660,411 | Bodor | Feb. 28, 1928 |
| 2,292,593 | Amigo | Aug. 11, 1942 |
| 2,367,962 | Reibold et al. | Jan. 23, 1945 |